(12) United States Patent
Dawson et al.

(10) Patent No.: US 7,657,491 B2
(45) Date of Patent: Feb. 2, 2010

(54) APPLICATION OF FUZZY LOGIC TO RESPONSE AND UNSOLICITED INFORMATION

(75) Inventors: Devon L. Dawson, Rocklin, CA (US); Steven V. Britt, Roseville, CA (US); Adrian Cowham, Roseville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 318 days.

(21) Appl. No.: 11/590,049

(22) Filed: Oct. 31, 2006

(65) Prior Publication Data
US 2008/0154804 A1    Jun. 26, 2008

(51) Int. Cl.
G06F 15/18 (2006.01)
(52) U.S. Cl. .......................................................... 706/8
(58) Field of Classification Search .................... 706/3, 706/15, 26, 33, 34, 41; 700/1, 28, 48; 709/229, 709/218, 227, 238
See application file for complete search history.

(56) References Cited

U.S. PATENT DOCUMENTS

| 5,740,322 A * | 4/1998 | Inoue ............................ 706/45 |
| 6,321,267 B1 * | 11/2001 | Donaldson ................... 709/229 |
| 6,993,686 B1 * | 1/2006 | Groenendaal et al. ......... 714/47 |
| 2005/0065753 A1 * | 3/2005 | Bigus et al. ................. 702/186 |

OTHER PUBLICATIONS

John E. Dickerson and Julie A. Dickerson, Fuzzy Network Profiling for Intrusion Detection, 2000, IEEE, pp. 301-306.*
John E. Dickerson et. al, Fuzzy Intrusion Detection, 2001, IEEE, pp. 1506-1510.*

* cited by examiner

Primary Examiner—David R Vincent
Assistant Examiner—Ola Olude-Afolabi

(57) ABSTRACT

A network management station includes a processor, memory coupled to the processor, and computer executable instructions provided to the memory and executable by the processor. The computer executable instructions are configured to transmit a network management message to a network device connected to the network management station over a network, receive response information from the network device based on the network management message, receive unsolicited information from the network device, and apply fuzzy logic to the received information and the unsolicited information to produce information associated with the health of the network device.

20 Claims, 4 Drawing Sheets

APPLICATION OF FUZZY LOGIC TO RESPONSE AND UNSOLICITED INFORMATION

BACKGROUND

Monitoring computer system or application performance is a complex task. Many metrics (CPU utilization, queue lengths, number of threads, etc.) can contribute to an overall measure of system performance. One approach to measuring system performance has been to identify specific metrics for which explicit numeric thresholds are set and tested at specified intervals. When the specific metrics exceeds the threshold an alert event is signaled indicating an error condition.

This approach, however, has drawbacks. Individual metrics in isolation are poor indicators of overall system state. Metric values may tend to oscillate in a range that could trigger and retrigger alarms as they cross the fixed threshold. Additionally, metric values may naturally vary over a wide range, making the selection of an appropriate threshold value very difficult. Consequently, there could be many false alarms. To reduce the number of false alarms, averaging of metric values or more complex triggering reset mechanisms have be suggested.

System health has also been monitored using a set of metrics that partition the system state into three modes, representing normal, warning, and error conditions. A "traffic light" iconic display has been used, where green indicates normal system state, yellow indicates a warning system state, and red indicates an error system state. While this type of display may be more intuitive than the binary alert approach, it adds increased complexity to the monitoring system because an algorithm must be derived to compute the ternary system state from the set of performance metrics or from a stream of binary alarm events. Often these algorithms are not exposed to the end-users or administrators and so they are unable to gauge the appropriateness of the green/yellow/red state classifications to the underlying performance metrics.

DETAILED DESCRIPTION

Embodiments of the present disclosure execute instructions to convey information associated with the health of various network devices, including information associated with the health of one or more individual network devices and/or the health of a network. Embodiments include applying fuzzy based rules to a metric from a network device to produce a variable fuzzy based rule expression. The metrics used in the present disclosure can be either requested information (e.g., solicited) and/or unsolicited information from one or more of the network devices, including all of the network devices.

The variable fuzzy based rule expression can then be used as an input parameter to a fuzzy rule based heuristic. The fuzzy rule based heuristic can then provide information associated with the health of the network device and/or the overall health of the network. In additional embodiments, the variable output from a fuzzy rule based heuristic can be used as an input parameter to another fuzzy rule based heuristic. In this manner, variable outputs from several fuzzy rule based heuristics can be combined to provide information associated with the health of a particular network device, group of network devices, and/or an overall health of the network.

The embodiments of the present disclosure may be implemented in a stand-alone computing system or a distributed computing system. As such, FIGS. 1-4 are intended to provide a context for the description of the functions and operations of the present disclosure. That is, the functions and operations described herein may be performed in one or more of the network devices described herein.

Figure 1:
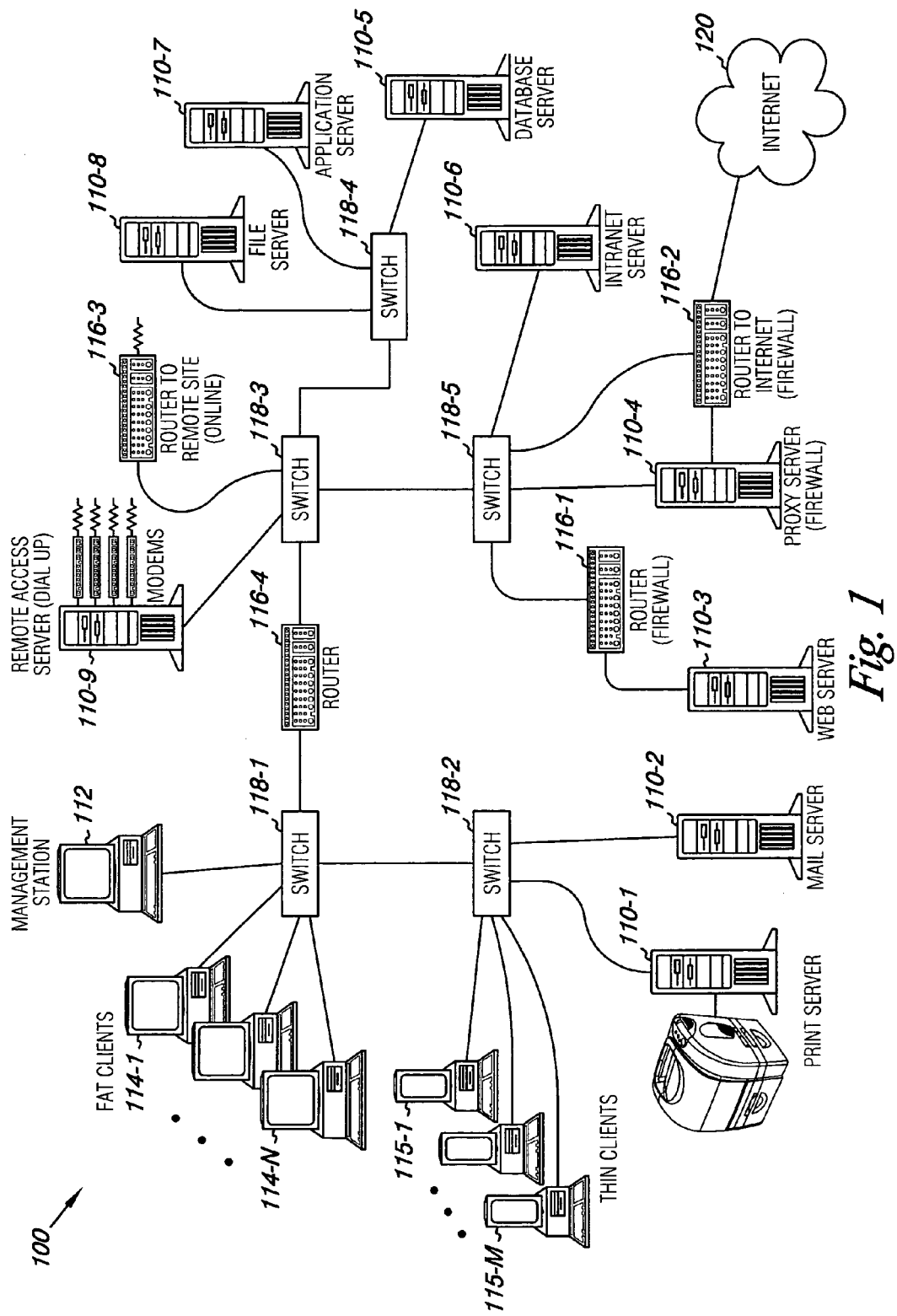
FIG. 1 is an embodiment of a computing device network.

FIG. 1 is an embodiment of a computing device network 100. As shown in FIG. 1, a number devices can be networked together via a LAN and/or WAN via router, hubs, switches and the like. The embodiment of FIG. 1 illustrates client and servers in a LAN. However, embodiments of the disclosure are not so limited. The embodiment shows one server for each type of service on a LAN. However, in practice several functions can be combined in one device or machine and, for large volumes, multiple devices or machines can be used to balance the traffic for the same service. For example, an enterprise system or network can include a collection of servers, or server farm, cooperating to provide services to the network.

FIG. 1 illustrates a print server 110-1 to handle print jobs for the network 100, a mail server 110-2, a web server 110-3, a proxy server (firewall), a database server 110-5, and intranet server 110-6, an application server 110-7, a file server 110-8, and a remote access server (dial up) 110-9. Again, the examples provided here do not provide and exhaustive list. The embodiment of FIG. 1 further illustrates a network management station 112, e.g., a PC or workstation, a number of "fat" clients 114-1, . . . , 114-N which can also include PCs and workstations and/or laptops, and a number of "thin" clients 115-1, . . . , 115-M which can include terminals and/or peripherals such as scanners, facsimile devices, handheld multifunction device, and the like. The designators "N" and "M" are used to indicate that a number of fat or thin clients can be attached to the network 100. The number that N represents can be the same or different from the number represented by M. The embodiment of FIG. 1, illustrates that all of these example network devices can be connected to one another and/or to other networks via routers, 116-1, 116-2, 116-3, and 116-4, and hubs and/or switches 118-1, 118-2, 118-3, 118-4, and 118-5, as the same are know and understood by one of ordinary skill in the art. Embodiments of the disclosure, however, are not limited to the number and/or quantity of network devices in FIG. 1's illustration.

As one of ordinary skill in the art will appreciate, many of these devices include processor and memory hardware. By way of example and not by way of limitation, the network management station 112 will include a processor and memory as the same are well know to one of ordinary skill in the art. Embodiments of the disclosure are not limited, for the various devices in the network, to the number, type or size of processor and memory resources.

Program embodiments (e.g., computer executable instructions), as described in more detail below, can reside on the network management station 112. Embodiments, however, are not so limited. That is, a program embodiment can be resident on the network 100 in the memory of the network management station 112, and executable by the processor thereon. Additionally, however, the program embodiments can be resident elsewhere in the network 100 such as in a distributed computing network.

As the reader will appreciate, the embodiments described can be performed by software, application modules, application specific integrated circuit (ASIC) logic, and computer executable instructions operable on the systems and devices shown herein or otherwise. The disclosure, however, is not limited to any particular operating environment or to software written in a particular programming language. Software, application modules and/or computer executable instructions, suitable for carrying out embodiments of the present disclosure, can be resident in one or more devices or locations or in several devices and location in a network.

Fuzzy rules as described herein can be configured at runtime, rather than being hard-coded into particular software. This allows an end user to be able to contribute their knowledge of the nature of a given network device, group of network devices, and/or an overall network, and what they consider to be good or bad device/network health, e.g., including knowledge as to actual performance or configuration, rather than relying on a set of rules hard-coded into particular software. Fuzzy rules can also be changed according to computer executable instructions executing to adjust the rules based on actual performance learned as feedback from a particular device, group of devices, and/or a network.

Unless explicitly stated, the method embodiments described herein are not constrained to a particular order or sequence. Additionally, some of the described method embodiments can occur or be performed at the same point in time.

Figure 2A:
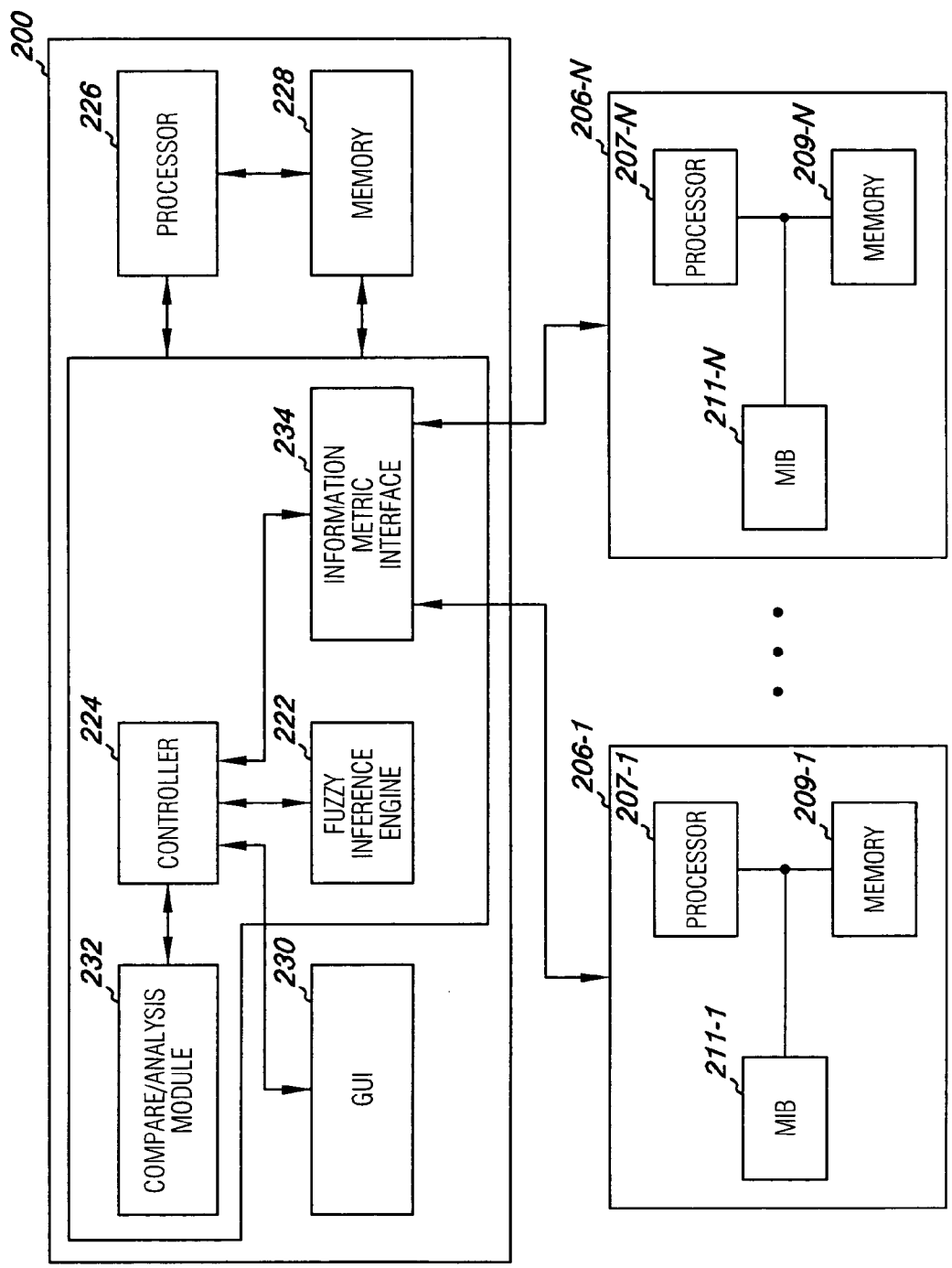
FIG. 2A is an embodiment of a computing device network.

FIG. 2A provides an illustration of a network management station 200 having processor 226 and memory 228 that can be used to store and execute computer executable instructions associated with embodiments of the present disclosure. As illustrated, the network management station 200 can have a number of network devices 206-1, . . . , 206-N, connected thereto over a network such as the network shown in FIG. 1. The network devices 206-1, . . . , 206-N can each include a processor 207-1, . . . , 207-N, memory 209-1, . . . , 209-N, and a MIB 211-1, . . . , 211-N, among other components.

In the example embodiment shown in FIG. 2A, the network devices 206-1, . . . , 206-N can be connected to the network management station 200, as discussed herein, through an information metric interface 230 such that the network management station can receive polled and unsolicited information, e.g., associated with measured metrics, from various network devices connected thereto. One of ordinary skill in the art will appreciate the manner in which computer executable instructions can be executed in conjunction with a network management program, which employs a protocol such as SNMP, ICMP, etc., to collect response information from the various network devices 206-1, . . . , 206-N.

For example, computer executable instructions can be executed to collect polled response information returned in response to network management messages sent as SNMP messages, ICMP pings, programmatic CLI, etc. Data representing measured metrics can be passed from SNMP agents, in the form of hardware, firmware, and/or software processes, or combinations thereof, reporting activity in each network device, e.g., hub, switch, server, peripheral, router, workstation, laptop, etc., to the network management station 200 via the information metric interface 234.

Examples of measured metrics associated with the response information can include processor utilization, a measure of port traffic, port up or down, how new a particular network device is and/or how new a particular version of software operating thereon is, the security configuration of the particular network device (e.g., password protected, etc.), the physical temperature of the device, how many dropped packets, power supply, device memory utilization, a link up/down status, statistics, including but not limited to, discards, CRC (cyclical redundancy checking) or FCS (frame check sequence) errors and number of broadcasts, a trap receipt, device and/or network buffer utilization, other device and/or network error receipts, the workload and/or resource utilization of the network device and/or the network, etc.

Additionally, according to embodiments, computer executable instructions can execute to receive unsolicited information associated with measured metrics from various components, e.g., information associated with measured metrics contained in a MIB, 211-1, . . . , 211-N, of the various network devices 206-1, . . . , 206-N. As the reader will appreciate, the MIB is a data structure that defines what is obtainable from the device and what can be controlled, measured, or monitored, turned off, turned on, etc.

The unsolicited information includes messages that are initiated by a network device 206-1, . . . , 206-N and not received in response to a particular request. For example, a given network device 206-1, . . . , 206-N may periodically initiate and transmit messages to a network management program that are not in response to an SNMP message, ICMP ping, and/or other request. Unsolicited information can include messages reporting successful events, messages reporting the violation of a traffic threshold, messages reporting a non-functioning component on a network device 206-1, . . . , 206-N, etc. One example includes receiving a message initiated from a network device 206-1, . . . , 206-N to a management program, which reports that a packet of data has been successfully sent from a particular port on a particular device 206-1, . . . , 206-N. Another example includes receiving a message initiated from a network device to a management program, which reports the device's processor utilization, memory utilization, link status, and local area network (LAN) utilization, among other information. As will be described further below, computer executable instructions can be executed to apply fuzzy rules to this receive information, polled and unsolicited, to produce fuzzy rule based expressions associated with the measured metrics.

The reader will appreciate the utility of these various types of information. For example, receipt of an interrupt trap will cause instructions to wait for a particular interrupt to occur and then execute a corresponding routine in order to test for a particular condition in a running program. Receipt of an error trap includes instructions which execute to test for an error condition and to provide a recovery routine. And, a debugging trap includes instructions to wait for the execution of a particular instruction in order to stop the program and analyze the status of a system at that moment.

As shown in the example embodiment of FIG. 2A, a controller 224 can connect to the interface 234 and can coordinate an exchange of this received information, polled and unsolicited, between the information metric interface 230 and a fuzzy inference engine 222 as well as a compare/analysis module 232. In this manner, computer executable instructions associated with the fuzzy inference engine 222 can be executed to apply fuzzy based rules to the individual measured metrics in the received information as the metrics reflect information about a certain feature or component of a particular network device 206-1, . . . , 206-N. It is also possible that fuzzy based rules can be applied to the same and/or different measured metrics from various network devices 206-1, . . . , 206-N. In addition, each particular measure metric can have a unique associated fuzzy based rule applied thereto. It is also possible that one associated fuzzy based rule can be used for more than one of the individual metrics.

As the reader will appreciate, the fuzzy based rules can be representative of a defined function, e.g., triangular, Gaussian, Bell, exponential, etc., against which an individual and/or group of measured metrics can be compared to provide a variable fuzzy rule based expression. That is, computer executable instructions can execute to apply a fuzzy based rule by comparing measured metrics with the defined functions they represent. The computer executable instructions can then execute to produce a variable fuzzy rule based expression based on the comparison, e.g., based on a particular measured metric fit to different portions of the function. Examples of such fuzzy rule based expressions include, but are not limited to, "low", "normal", "high", robust", "congested", "good", "bad", "average", "busy", "nominal", etc. Other variable fuzzy rule based expressions are also possible.

As the reader will appreciate, application of fuzzy based rules accommodate natural language rules to define a relationship between measured metrics and their range of operation according to various defined functions associated with those fuzzy based rules. The variable fuzzy rule based expressions then provide a more intuitive expression to a user for the assessment of such measured metrics among various network device(s) 206-1, . . . , 206-N. That is, the fuzzy based rule defines conditions that lead to a particular expression of information associated with each network device, group of devices and/or the network as a whole. In various embodiments, application of the fuzzy based rules can involve: first, defining functions for the fuzzy based rules; second, setting the range of operation for the fuzzy based rules associated with a particular metric, e.g., a percentage of processor usage. Each range can result in a different fuzzy rule based expression. That is, for example, percent of processor usage between X and Y produces a fuzzy rule based expression of "low", between Y and Z produces a fuzzy rule based expression of "high", etc.

The fuzzy based rules can be physically tailored by the network administrator, e.g., one or both the function and the expressions associated with portions of the function for each metric. For example, the network administrator could provide the values for X, Y, Z, etc. along with the associated expressions, described above. Furthermore, the network administrator could also tailor the fuzzy based rules applied to the individual metrics over time based either on user interaction (physical use experience and/or known performance parameters of a particular network device) or through computer executable instructions executing in connection with the compare/analysis module 232 to compare the fuzzy based rules and resulting fuzzy rule based expressions of health with actual, e.g., physical, performance and health of a given device, group of devices, and/or the network as a whole.

In the later example, computer executable instructions associated with the compare/analysis module 232 can be executed to change the fuzzy based rules that are applied to the individual metrics over time. That is, computer executable instructions associated with the compare/analysis module 232 can be executed to learn from a variable output of a fuzzy rule based heuristic (described further below) relative to an actual performance of the components, devices, group of devices, etc., which those expressions represent. For example, initially it may be provided that a processor usage of 60% has a variable fuzzy rule based expression of "good", but in actuality the processor usage of the network device and/or the network is determined to be not so "good." In this example, the derived fuzzy rule base expression can be compared to the true physical performance of a given network device and/or combination of devices to shift or change the fuzzy rule based expressions over time.

According to various embodiments, the fuzzy inference engine 222 can additionally execute instructions to apply the variable fuzzy based rule expression as input parameters to a fuzzy rule based heuristic. In this manner, a fuzzy rule based heuristic can provide a resulting output conveying information associated with a health of a particular network device, group of devices and/or the network itself. Additionally, a variable output from one fuzzy rule base heuristic can also be used as an input parameter to one or more additional fuzzy rule based heuristics. As described above, the fuzzy rule based heuristic can use natural language, such as "if switch utilization is very high AND packets dropped is above N then health is very low" and the like. This is one example of many possible for the use of a fuzzy rule based heuristic using this natural linguistic definition format. As another example, the percentage of processor usage in one network device can be used in a first heuristic from which a variable fuzzy rule based expression results. This result can then be chained into a second heuristic that is built to produce an output that is a reflection of variable fuzzy rule based expression (weighted or unweighted) for a number of devices. Hence, the fuzzy rule based heuristic thus conveys information associated with the health of a particular network device, group of devices, and/or network in a natural language format.

In various embodiments, computer executable instructions associated with the fuzzy inference engine 222 can be executed to apply the variable fuzzy based rule expressions as input parameters to the fuzzy rule based heuristic in either a weighted or unweighted manner. With respect to weighting the variable fuzzy rule based expressions the computer executable instructions can be executed by the fuzzy inference engine 222 to weight the expressions using pre-determined weight values, scaling factors, established by a network administrator. That is, a network administrator to use an I/O mechanism (e.g., keyboard, mouse, touch panel, etc.) to tailor the weighting and/or scaling factors applied to particular the fuzzy based rule expressions as relevant to a particular type of network device and/or a particular network.

For example, among three network devices, a network administrator may be most concerned about the first device, less concerned about the second device and moderately concerned about the third device. Each of these three devices can have one or more metrics associated with received information, received from polling and/or in an unsolicited manner. Fuzzy based rules applied by the fuzzy inference engine 222 can be used to produce variable fuzzy rule based expressions, which can in turn be used in a first fuzzy rule based heuristic for each device. An output of the first fuzzy rule based heuristic can then produce for each device that can then be used in a second fuzzy rule based heuristic having as input parameters the output of the first fuzzy rule based heuristic from each device.

In this example, the input parameters taken as the outputs from the first fuzzy rule based heuristic for each device can be weighted differently based on an assessment of what will keep this group of devices healthy. Again, here, the assessment can be physically entered by a network administrator. Alternatively, computer executable instructions associated with the compare/analysis module 232 can be executed to adjust the weighting of particular fuzzy rule based expressions over time based on a learned relevance of the particular fuzzy rule based expressions as input parameters to another fuzzy rule based heuristic. Hence, an output of the second fuzzy rule based heuristic can be produced which conveys information about the group of three network devices.

As shown in FIG. 2A the collective group of the fuzzy inference engine 222, controller, compare analysis module 232, and information metric interface 234 can interact with a graphical user interface (GUI) 230 to present the fuzzy based rule expressions and variable outputs from one or more fuzzy rule based heuristics to a network user. Such representations of the health of the network device, group of devices, and/or network can thus be represented by natural language terms.

In various embodiment, computer executable instructions are additionally executed to suggest or even automatically initiate actions to preemptively avoid deleterious network events, e.g. a device or network crash.

Additionally, as the reader will appreciate, iconic representations can be provided to the GUI 230 which represent a health of the network device, group of devices, and/or network in the form of graphs, numeric outputs, audible alarms or announcements, tactile output, and the like. As one example, each icon can be displayed in various color codes which represent the measurements and calculated results in order to visually indicate the information associated with the health of the network device of a particular network attached device and in order to visually indicate a problem to be avoided on the device and/or network.

Various color codes can include a much wider variety of indicator colors than the three colors of red, yellow, and green used in previous network management approaches. In various embodiments a number of different colors and shades are used to accommodate the added degrees of health measured for a network device. For example, the use of color gradients, textured patterns, and/or multi-part coloring of the icons, rather than just basic colors, can be provided to represent different parameters, e.g., CPU utilization, memory utilization, broadcasts, discards, CRC and FCS errors, etc., of the information associated with the health of the network device. Embodiments of the disclosure are not limited to these particular visual indication examples.

In various embodiments, computer executable instructions can be executed such that when a given icon is selected additional levels of detail or granularity, e.g. additional report information, on the information associated with the health of a particular network device is provided. Thus, upon selecting a particular icon which is of interest the computer executable instructions can execute to reveal in greater detail the reasons behind why the device has a particular health measurement, e.g., why CPU, memory, or LAN utilization is high causing a particular device to be overburdened and/or a candidate to crash.

Figure 2B:
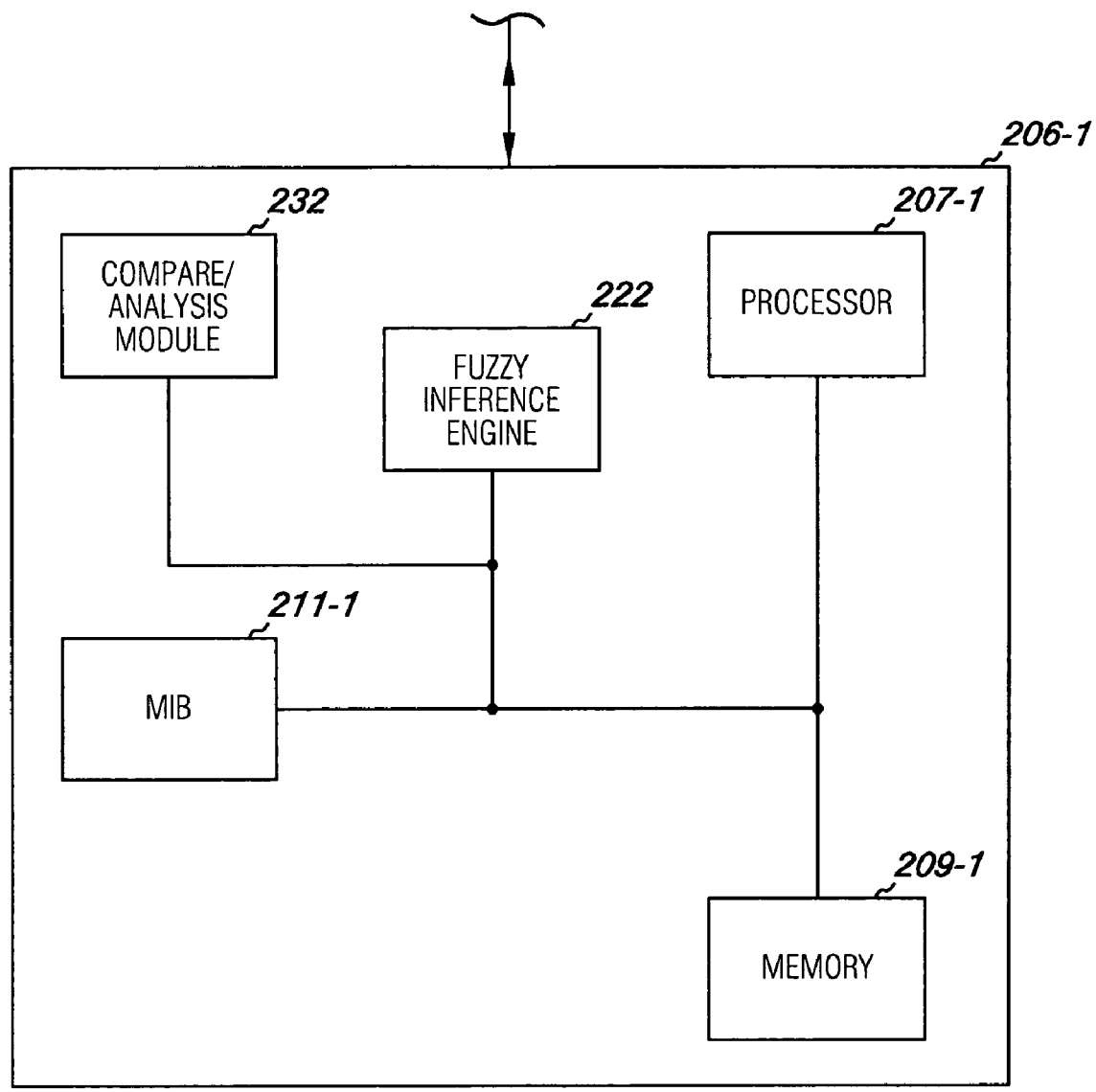
FIG. 2B is an embodiment of a network device.

FIG. 2B is an embodiment of a network device including fuzzy logic according to the present disclosure. The embodiment of FIG. 2B is intended to illustrate that computer executable instructions embodiments, e.g., as described in connection with FIG. 2A, may be provided directly to a particular network device, e.g., 206-1. That is, in order to provide information associated with the health of a particular network device and/or the overall health of a network to which the device is attached, computer executable instructions associated with a fuzzy inference engine 222 and compare analysis module 232 may reside on the individual network device 206-1 rather than, or in addition to, residing on the network management station 200 discussed in FIG. 2A. The computer executable instructions can be executed to apply fuzzy based rules to polled and unsolicited metrics associated with various components, e.g., processor 207-1, memory 209-1, MIB 211-1, ports, etc., of the network device 206-1. This in turn will produce the fuzzy rule based expressions as described above. Additionally, computer executable instructions associated with a fuzzy inference engine 222 on network device 206-1 can also be executed to use the variable fuzzy based rule expressions as input parameters to a fuzzy rule based heuristic as the same has been described in connection with FIG. 2A. A variable output of one fuzzy rule based heuristic can similarly be used as an input parameter to one or more additional fuzzy rule based heuristics. The information associated with the health of the network device and/or the overall health of the network can then be provided to a display such as the GUI 230 shown in FIG. 2A to more intuitively convey information about the individual network device 206-1, a group of devices, and/or the network to which device 206-1 is attached.

As such, computer executable instructions associated with a fuzzy inference engine, e.g., 222, can be executed on one or more of the network device 206-1, . . . , 206-N themselves. That is, the network device itself could house the fuzzy inference engine 222 and the compare/analysis module 232 to perform its own local determination of health using the fuzzy based rules, expressions and heuristics, as discussed herein. FIG. 2B provides an illustration of such a network device 206-1. This embodiment can also allow the metrics to be evaluated and/or fuzzy rules applied locally, as compared to remotely, e.g., on a remote network management station as 200 in FIG. 2A. The fuzzy rule based expressions and outputs from fuzzy rule based heuristics could additionally be broadcast, e.g., sent in an unsolicited manner with some frequency, elsewhere in a given network and/or polled with some frequency from elsewhere in the network, e.g., polled from a network management station 200 in FIG. 2A, for use by neighboring network devices as well as by the network management station 200.

In other embodiments, the fuzzy based rules, expressions and heuristics can be sent to a given network device 206-1, . . . , 206-N, e.g., from a network management station 200, allowing the NMS 200 to fine tune the fuzzy based rules, expressions and heuristics, as discussed above, while the actual fuzzy inference engine 222 and the compare/analysis module 232 remain resident on the network management station 200.

Figure 3:
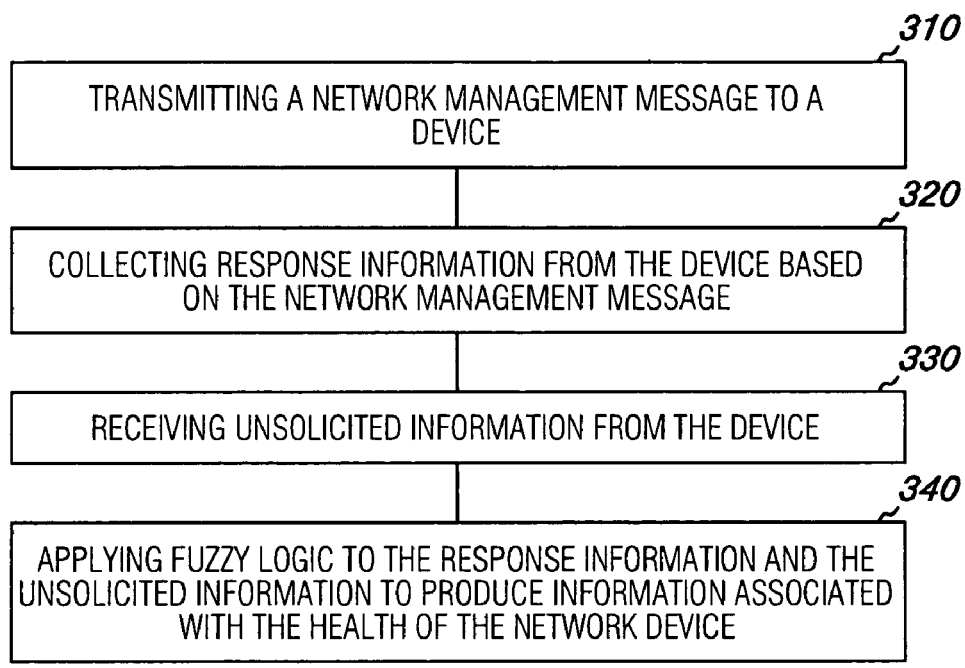
FIGS. 3-4 illustrate various method embodiments for conveying information associated with the health of various network devices and/or the network.
Figure 4:
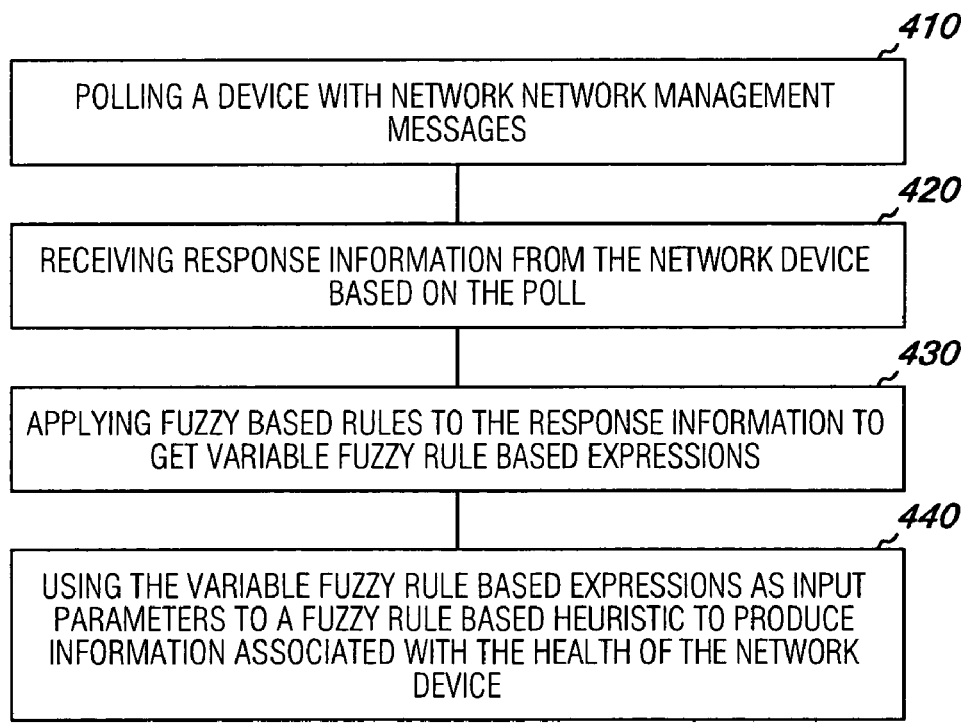

FIGS. 3 and 4 illustrate various method embodiments associated with producing information associated with the health of a network device and/or a network. The method embodiments can be performed by software, application modules, and computer executable instructions operable on the systems and devices shown herein or otherwise. The disclosure, however, is not limited to any particular operating environment or to software written in a particular programming language. Software, application modules and/or computer executable instructions, suitable for carrying out embodiments of the present disclosure, can be resident in one or more devices or locations or in several devices and location in a network.

One of ordinary skill in the art will appreciate the manner in which the computer executable instructions described herein can be provided to a particular network management station (network management server), a particular network device, and/or group of network devices in a network. For example, computer executable instructions can be loaded from a floppy disk, CD, or other medium of the like and in order to provide the instructions to a particular device, e.g., a network management station, on the network. Similarly, the computer executable instructions can be downloaded from a remote source over a network connection such as the Internet. Embodiments are not limited to these examples.

Unless explicitly stated, the method embodiments described herein are not constrained to a particular order or sequence. Additionally, some of the described method embodiments can occur or be performed at the same point in time.

FIG. 3 illustrates a method embodiment associated with producing information associated with the health of a network device and/or a network. In the embodiment of FIG. 3, the method at 310 includes transmitting a network management message, e.g., an SNMP, ICMP, or other similar message as the same are know and understood by one ordinary skill in the art, to a network device.

The device can be coupled to a network management station over a LAN and/or WAN, including wired and wireless network environments. The network management message is transmitted and pertains to a network port on the device. In various embodiments, a network management station includes a network management program application to transmit an SNMP message, for example, to the network attached device. In various embodiments, such a management program application executes instructions to use the SNMP message to query a device and retrieve MIB data.

At 320, the method includes receiving response information from the network device based on the network management message. One of ordinary skill in the art will appreciate the manner in which response information may be returned, e.g., to a network management program on a network management station, in response to a network management message.

At 330, the method includes receiving unsolicited information from the network device. Again, one of ordinary skill in the art will appreciate the manner in which unsolicited information may be received from a network device, e.g., sent to a network management program on a network management station by an intelligent network device. As described in detail above, receiving unsolicited information from the device can include receiving information relating to; processor utilization, memory utilization, local area network utilization, statistics including discards, CRC or FCS errors, etc., and other associated errors. Further receiving unsolicited information from the device includes receiving messages selected from the group of; messages reporting successful events, messages reporting a traffic threshold, and messages reporting a non-functioning component on the device.

At 340, the method includes applying fuzzy logic, as discussed herein, to the response information and the unsolicited information to produce information associated with the health of the network device. As discussed, the fuzzy based rules have been provided for use in assessing whether the network device is currently operating in a normal operating manner or in another operating range. The fuzzy based rules can then be used with the metrics, both solicited and unsolicited, to produce the variable fuzzy based rule expressions. The fuzzy logic inference engine can then use the expressions with the fuzzy based heuristics to arrive at the information associated with the health of the network device and/or the network as a whole.

For example, the metric values for the network device are received and/or provided to the fuzzy logic inference engine. The fuzzy logic inference engine, along with the compare/analysis module, uses the fuzzy based rules to arrive at the variable fuzzy based rule expressions. The fuzzy logic inference engine can then apply the expressions as input variables to a fuzzy rule based heuristic. The fuzzy rule based heuristic can then provide information associated with the health of the network device and/or the overall health of the network. The fuzzy logic inference engine can also use the variable fuzzy based rule expression to provide a variable output that can, but not necessarily, be used as an input parameter to one or more additional fuzzy rule based heuristic. Based on the variable output, the one or more additional fuzzy rule based heuristic provides information associated with the health of the network device and/or the overall health of the network.

The health measurement can then be provided on a graphical user interface (GUI) of the administrator workstation. This GUI may include text, graphics, audio, and the like. The GUI provides the administrator with information regarding the current information associated with the health of the network device and/or the overall health of the network. The GUI also permits the administrator to navigate through various levels of detail of information such that the administrator may "drill-down" or "drill-up" through the system hierarchy to determine the health of the system at various levels. As a result, the administrator is given a comprehensive output of the system health that is easily manipulatable and is as accurate as possible since the fuzzy logic of the disclosure can be updated to be current with current operational environment conditions.

When it is determined that the health of the network device is not as described through the use of the fuzzy logic, the fuzzy based rules, expressions and heuristics, as described herein, can be used to more accurately reflect the health state of the network device. For example, the network administrator can implement the fuzzy based heuristic to update the fuzzy based rules and/or expressions based on feedback of system performance, as discussed herein. Embodiments, however, are not limited to these example parameters.

FIG. 4 illustrates another method embodiment associated with producing information associated with the health of a network device and/or a network. In the embodiment of FIG. 4, the method includes polling a network device with network management messages at 410. In 420 the method includes receiving response information (i.e., metrics) from the polled request, as discussed herein. In 430, the method includes applying the fuzzy based rules to the response information to produce the variable fuzzy rule based expressions. In 440, the method includes using the variable fuzzy based expressions as input parameters to the fuzzy rule based heuristic to produce information associated with the health of the network device.

As used herein, applying heuristics includes using the received information as parameters to the applied heuristic. As one of ordinary skill in the art will appreciate upon reading this disclosure, examples of an applied heuristic for analyzing and weighting various parameters are not limited to the examples given herein. One of ordinary skill in the art will appreciate upon reading this disclosure the variety of heuristics which may be applied as suited to different network devices and/or network environments to capitalize on both collected network management messages and received, unsolicited device information to more robustly determine the information associated with the health of the network device and/or network.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure. It is to be understood that the above description has been made in an illustrative fashion, and not a restrictive one. Combination of the above embodiments, and other embodiments not specifically described herein will be apparent to those of skill in the art upon reviewing the above description. The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in a single embodiment for the purpose of streamlining the disclosure. This method of disclosure is not to be interpreted as reflecting an intention that the embodiments of the disclosure require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A network management station, comprising:
   a processor;
   a memory coupled to the processor; and
   computer executable instructions provided to the memory and executable by the processor to:
   transmit a network management message to a network device connected to the network management station over a network;
   receive response information from the network device based on the network management message;
   receive unsolicited information from the network device; and
   apply fuzzy logic to the received response information and the unsolicited information to produce information associated with the health of the network device.

2. The station of claim 1, where the computer executable instructions execute to evaluate metrics as received information, the metrics selected from:
   a network device processor utilization;
   a device memory utilization;
   a local area network (LAN) utilization;
   errors;
   packet traffic flow through device;
   port up/down status;
   a frequency of ports up or down;
   a warning of power supply problem on the device;
   an age of software on the device;
   a configuration of the device;
   a number of users using the device;
   changes to a physical location of the device; and
   trap information of the network device for the receive information.

3. The station of claim 2, where the unsolicited information and the requested information are a number of heuristic variables selected from the measured metrics.

4. The station of claim 1, wherein the fuzzy logic comprises as parameters fuzzy rule based expressions derived from the group of; processor utilization, memory utilization, LAN utilization, statistics including discards, cyclical redundancy checking (CRC) and frame check sequence (FCS) errors and number of broadcast, and traps, received as both received and unsolicited information from the device.

5. The station of claim 1, farther including computer executable instructions that execute to analyze unsolicited information initiated from the device to a management program, the unsolicited information selected from the group of:
   information reporting successful events;
   information reporting a traffic threshold; and
   information reporting a non-functioning component on the device.

6. The station of claim 1, further including computer executable instructions that execute to collectively analyze all of the information, both requested and unsolicited, in order to formulate the information associated with the health of the network device.

7. The station of claim 1, further including computer executable instructions that execute to assign pre-selected weight values to the received and unsolicited information as part of an applied fuzzy rule based heuristic and to analyze the weight values over time as compared against an actual health of the network device.

8. The station of claim 7, further including computer executable instructions that execute to initiate network actions, based on the information associated with the health of the network device, to avoid potential issues with the device and the network.

9. The station of claim 1, further including program instructions that execute to implement different weight values to requested and unsolicited information as parameters to the fuzzy logic as suited to a particular type of network device.

10. A network device, comprising:
    a processor;
    a memory coupled to the processor; and
    computer executable instructions provided to the memory and executable by the processor to:
    poll a component of the network device for information associated with health metrics;
    receive information from the component based on the poll;
    apply fuzzy based rules to the received information to produce variable fuzzy rule based expressions; and
    use the variable fuzzy rule based expressions as input parameters to a fuzzy rule based heuristic to produce information associated with the health of the network device.

11. The station of claim 10, further including computer executable instructions that execute to receive unsolicited information from the component of the network device and to apply fuzzy based rules to the unsolicited information to produce variable fuzzy rule based expressions.

12. The station of claim 10, further including computer executable instructions that execute to utilize the received information from the polling and the unsolicited information in the fuzzy based rules to refine the information associated with the health of the network device.

13. The station of claim 10, further including computer executable instructions that execute to initiate an action based on the information associated with the health of the network device in order to avoid a problem on the device and a network to which the device is attached.

14. A method for network device assessment, comprising:
    transmitting a network management message to a device;
    receiving response information from the device based on the network management message;
    receiving unsolicited information from the device; and
    applying fuzzy logic to the received response information and the unsolicited information to produce information associated with the health of the network device.

15. The method of claim 14, where applying fuzzy logic includes:
    applying fuzzy based rules to the received response information and the unsolicited information to produce variable fuzzy rule based expressions; and
    using the variable fuzzy rule based expressions as input parameters to a fuzzy rule based heuristic to produce information associated with the health of the network device.

16. The method of claim 15, including weighting one or more of the variable fuzzy rule based expressions as input parameters to the fuzzy rule based heuristic to produce information associated with the health of the network device.

17. The method of claim 15, including producing a variable output of the fuzzy rule based heuristic; and
   using the variable output of the fuzzy rule based heuristic as an input parameter to one or more additional fuzzy rule based heuristics.

18. The method of claim 14, including utilizing the received response information and the unsolicited information in heuristics to refine the information associated with the health of the network device.

19. The method of claim 14, wherein the method further includes modifying the fuzzy logic with a heuristic analysis as suited to a particular type of network work and a particular type of network device.

20. The method of claim 14, including housing the fuzzy logic on one or more network devices; and
   reporting the information associated with the health of the network device from each of the one or more devices to a network management station.

* * * * *

UNITED STATES PATENT AND TRADEMARK OFFICE
CERTIFICATE OF CORRECTION

PATENT NO. : 7,657,491 B2
APPLICATION NO. : 11/590049
DATED : February 2, 2010
INVENTOR(S) : Devon L. Dawson et al.

Page 1 of 1

It is certified that error appears in the above-identified patent and that said Letters Patent is hereby corrected as shown below:

In column 11, line 55, in Claim 5, delete "farther" and insert -- further --, therefor.

Signed and Sealed this

Thirteenth Day of July, 2010

David J. Kappos
*Director of the United States Patent and Trademark Office*